United States Patent [19]
Lee

[11] Patent Number: 5,796,898
[45] Date of Patent: Aug. 18, 1998

[54] MODULAR OPTICAL FIBER CONNECTOR

[75] Inventor: Hsin Lee, Issaquah, Wash.

[73] Assignee: Fiberon, Inc., Issaquah, Wash.

[21] Appl. No.: 608,497

[22] Filed: Feb. 28, 1996

[51] Int. Cl.$^6$ ................................................. G02B 6/36
[52] U.S. Cl. ........................ 385/78; 385/77; 385/76; 385/84; 385/139
[58] Field of Search .......................... 385/56, 60, 70, 385/76, 77, 78, 81, 84, 86, 87, 139, 53

[56] References Cited

U.S. PATENT DOCUMENTS

| | | | |
|---|---|---|---|
| 5,040,867 | 8/1991 | De Jong et al. | 385/60 |
| 5,093,878 | 3/1992 | Haley et al. | 385/92 |
| 5,265,183 | 11/1993 | Feng et al. | 385/78 |
| 5,283,849 | 2/1994 | Cooke et al. | 385/77 |
| 5,363,459 | 11/1994 | Hultermans | 385/60 |
| 5,396,572 | 3/1995 | Bradley et al. | 385/78 |
| 5,436,994 | 7/1995 | Ott et al. | 385/86 |
| 5,515,466 | 5/1996 | Lee | 385/78 |

*Primary Examiner*—Brian Healy
*Attorney, Agent, or Firm*—Sixbey, Friedman, Leedom & Ferguson PC; Daniel W. Sixbey

[57] ABSTRACT

The modular optical fiber connector includes a ferrule body with a ferrule attached to the front end and a buffer back post extending from the rear end. The ferrule body is permitted to move longitudinally relative to an insert which receives the ferrule and engages the front end of the ferrule body but is restrained against rotation. A coil spring is installed onto the buffer back post of the ferrule body, and engages a connector body that is utilized to internally hold the ferrule body, the insert and the coil spring. A connector nut is a hollow component that has a limiter on the interior wall. The ferrule body and insert in the connector body are inserted into one end of the connector nut and a fastening ring is inserted into the other end of the connector nut, and onto the connector body which is permitted to have longitudinal movement relative to the connector nut within a limited range.

7 Claims, 1 Drawing Sheet

MODULAR OPTICAL FIBER CONNECTOR

BACKGROUND OF THE INVENTION

The invention herein relates to a connector and, furthermore, specifically concerns a modular optical fiber connector.

Optical fiber cable is currently being utilized on an ever increasing scale for the transmission of optic signals. The ends of optical fiber cable must be connected into an optical fiber connector before mutual continuity is facilitated or connected to other optical equipment. Optical fiber connectors must be capable of precision alignment with the optical fiber for optimum results to reduce interconnective transmission losses to the lowest degree.

As is well known in engineering, one type of optical fiber connector is the "FC" connector. Conventional FC connectors normally include many separate components and since some of the components are not assembled when leaving the factory, technicians must complete the installation to optical fiber. However, in regard to optical fiber data communications, it is often necessary to connect optical fiber cable in the field and, therefore, many optical fiber connector components must be delivered to the job site, where technicians outfit the optical fiber for installation. The disadvantages of connectors comprised of separate components is that a high quantity of parts is involved, much time is consumed at the work site for assembly and there is the possibility of encountering situations where assembly is difficult. Furthermore, the use of inexperienced technical personnel frequently leads to assembly and installation error.

The U.S. Pat. No. 5,265,183 addressed the aforementioned disadvantages by offering a kind of optical fiber connector and matching assembly tools. Although the optical fiber connector provided by the aforesaid United States patent utilized a reduced number of components and assembly was simpler than the aforementioned conventional technology, a relatively high number of components were still involved and field work was still necessary to assemble the aforesaid connector to the optical fiber cable because the connectors were shipped from the factory in the form of separate components.

Furthermore, when attaching traditional FC connectors to optical fiber ends, it was necessary to insert the ends into previously injected epoxy that was utilized to adhere the optical fiber into the ferrule of the optical fiber connector inside the buffer back post. However, the epoxy often overflowed and resulted in gluing the connector coil spring to the surface of the back buffer post, thereby disabling the function of the coil spring and, furthermore, leading to the disposal of the entire optical fiber connector, which constituted a significant waste of resources.

BRIEF DESCRIPTION OF THE INVENTION

Therefore, the primary objective of the invention herein is to provide a kind of modular-type FC optical fiber connector that only has a minimum number of components and leaves the factory as an assembled modular-type optical fiber connector to facilitate installation procedures conducted during field work.

Another objective of the invention herein is to provide a kind of modular FC optical fiber connector that prevents or greatly reduces the possibility of epoxy overflow during assembly and installation.

A still further object of the invention is to provide a modular optical fiber connector having a spring pressed ferrule body for receiving an optical fiber which is adapted to move longitudinally within a connector body but which is held against rotation.

To enable a thorough understanding of the objectives, innovations and advantages of the invention herein as well as the preferred embodiments thereof, the drawings and the detailed description of the invention herein are provided below:

DETAILED DESCRIPTION OF THE PREFERRED EMBODIMENT

Figure 1:
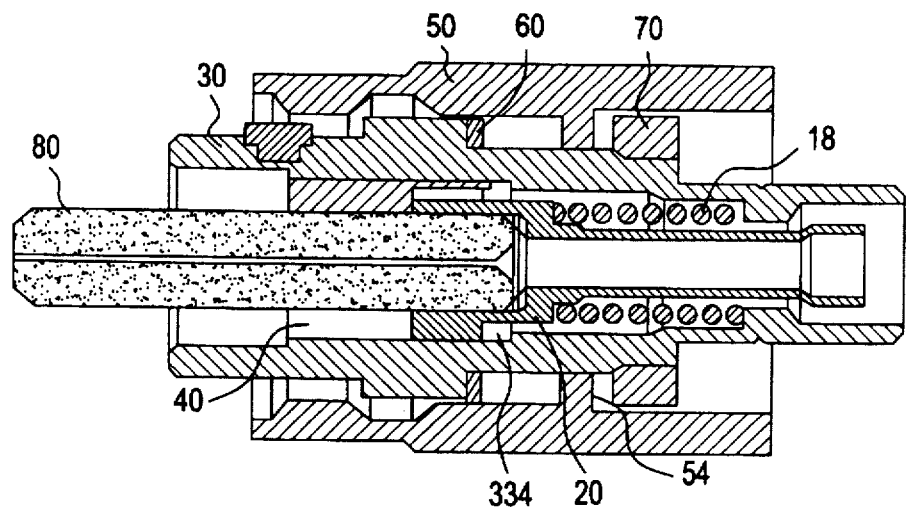
FIG. 1 is a cross-sectional drawing of the preferred embodiment of the invention herein, a fully assembled modular FC optical fiber connector in a magnified perspective.
Figure 2:
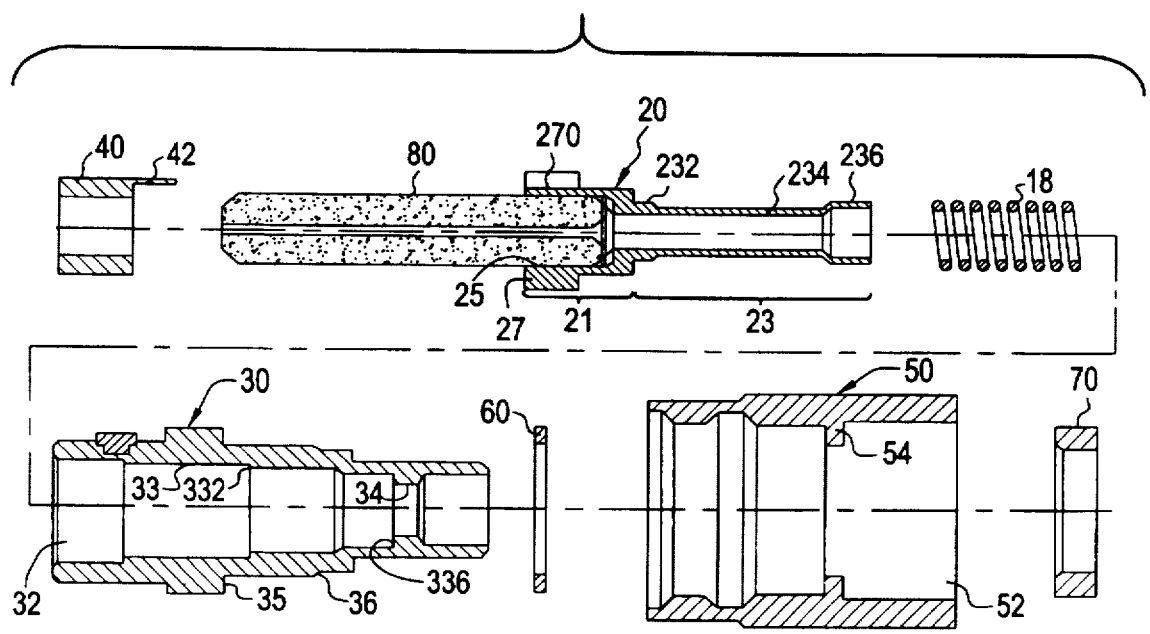
FIG. 2 is an exploded cross-sectional drawing of the preferred embodiment of the optical connector assembly and sub-assemblies of FIG. 1 in a magnified perspective.

Referring to FIG. 1 and FIG. 2, the cross-sectional drawing of the preferred embodiment of the invention herein, a modular optical fiber connector is shown in a magnified assembled and cross-sectional exploded views respectively. The aforesaid modular optical fiber connector is basically structurally comprised of a ferrule body (20), a ferrule (80), a connector body (30), a connector nut (50, an insert (40), a coil spring (18), a washer (60) and a fastening ring (70).

As indicated in FIG. 2, the ferrule body (20) has a ferrule holder (21) on one end (front end) and extending from the rear end of the ferrule holder (21) is a buffer back post (23). There is an opening (25) in the ferrule holder (21) and the inner diameter of the aforesaid opening (25) is smaller or approximately equivalent to the outer diameter of the ferrule (80) to provide a tight fit when the ferrule is received in the opening. The ferrule (80) can be secured in the ferrule holder (21) through other means such as adhesive fastening. At the front end of the ferrule holder (21) is an insertion ring or flange (27) that protrudes outward at a constant diameter and adjacent to the outer circumference of the insertion ring (27 is an access hole (270).

The buffer back post (23) is a hollow column and includes an end that is of larger diameter and extends out from the ferrule holder (21) in a step section (232). Of contiguous length but of slightly lesser diameter is a columnar section (234), and at the final extent of the columnar section is a flared section (236) of increased diameter.

The insert (40) is annular in shape and a tab (42) protrudes rearwardly from the circumference thereof. The insert (40) can be inserted over the front end of the ferrule (80) and moved over the ferrule until reaching the insertion ring (27) of the ferrule body (20). The tab (42) is inserted into the access hole (270) of the insertion ring (27). The insertion of the tab (42) of the insert (40) into the access hole (270) of the insertion ring (27) is designed to support coupling by axial sliding, but precludes axial rotation between the insert and the ferrule body.

The coil spring (18) is inserted over the rear end of the ferrule body (20) until the leading end of the coil spring (18) achieves a tight fit on the step section (232) of buffer back post (23). A suitable space is provided between the columnar section (234) and the coil spring (28) on the buffer back post (23) to maintain the optimum operation of the coil spring (18). After completing the assembly of the ferrule body (20), the ferrule (80), the insert (40) and the coil spring (18), the assembly with the connector body (30) is as follows.

The connector body (30) is a hollow shell that contains a continuous cavity (32) extending therethrough. Positioned inwardly in spaced relation to the front end of the continuous cavity (32) is a first ramp section (33) of reduced diameter and, positioned inwardly in spaced relation to the rear interior end of the continuous cavity (32) is a second ramp section (34) of a greater reduced diameter. On the center section of the connector body (30) exterior wall is a first raised section (35) and, furthermore, on the center section of the connector body (30) exterior wall is a second raised section (36).

During fabrication by the manufacturer, the ferrule body (20), the ferrule (80), the insert (40) and the coil spring (18) are assembled together and then inserted into the front end of the continuous cavity (32) through the connector body (30) by utilizing tools or pressure installation equipment. The insert (40) is firmly ensconced within the cavity (32) of the connector body (30) within a first ramp section (33) since the outer diameter of the insert (40) is greater or approximately equivalent to the inner diameter of the first ramp section (33). In the invention herein, the manner of securing the insert (40) to the connector body (30) can also be achieved by other methods such as adhesive conjoinment. The design of the aforesaid tools or assembly equipment should allow provision for a preset distance during the insertion of the insert (40) into the connector body (30) to enable the maintenance of an interval (334) (FIG. 1) between the rear edge of the insertion ring (27) on the ferrule body (20) and a shoulder (332) at the innermost end of the first ramp section (33). Following assembly, the design dimensions of the ferrule body (20), the coil spring (18) and the connector body (30) enables the rear end of the coil spring (18) to press against a shoulder 336 at the innermost end of the second ramp section (34) such that the coil spring (18) is under compression.

The modular optical fiber connector of the invention herein has a ferrule body (20) and a ferrule (80) that are subjected to the direct force of the coil spring (18) and, furthermore, are capable of inward movement due to the compressibility of the coil spring (18). Furthermore, since the tab (42) of the insert (40) is inserted into the access cavity (270) of the insertion ring (27) on the ferrule body (20), after the insert (40) is positioned and locked in the connector body 30, the ferrule body (20) has the advantage of being impervious to rotational movement.

A washer (60) is installed over the rear end of the connector body (30) and moved until contact is made with the first raised section (35) on the exterior wall of the connector body (30). After the assembly of the ferrule body (20), the ferrule (80), the insert (40), the coil spring (18), the connector body (30) and the washer (60), the assembly with the connector nut (50) is performed.

The connector nut (50) is a hollow component that has a continuous cavity (52) extending therethrough. On the interior wall centrally of the continuous cavity (52) is an inwardly projecting limiter (54). The front end of the ferrule body (20), the ferrule (80), the insert (40), the coil spring (18), the connector body (30) and the washer (60) as previously assembled are inserted into the continuous cavity (52) of the connector nut (50). A fastening ring (70) is placed into the rear end of the continuous cavity (52) of the connector nut 50, and is then installed onto the rear end of the connector body (30). Utilizing a tool or assembly equipment, the fastening ring (70) is pressed against the second raised section (36) on the exterior wall of the connector body (30) and secured in place by means of a tight fit with the exterior wall of the connector body (30). The foregoing procedure results in the assembled optical fiber connector of the invention herein depicted in FIG. 1.

In the invention herein, the means of anchoring the fastening ring (70) to the connector body (30) can be accomplished by alternative means such as threaded or adhesive conjoinment. Optionally, the fastening ring (70) can be a C-shaped snap ring or an E-shaped snap ring that is clipped onto a groove on the exterior walls of the connector body (30).

Referring to FIG. 1, the washer (60) positioned against the first raised section (35) on the exterior wall of the connector body (30) and the fastening ring (70) secured against the second raised section (36) on the exterior wall of the connector body (30) are both spaced from a respective side of the limiter (54) inside the connector nut (50) and there is a given interval in between the two aforesaid components. Since the limiter (54) will contact the washer (60) on the fastening ring (70), the connector body (30) is only capable of a limited range of forward and rearward axial movement within the connector nut 50.

In reference to the aforementioned preferred embodiment of the invention herein, the aforesaid modular optical fiber connector has a minimum number of components and, furthermore, has the advantage of being a modular optical fiber connector that is fully assembled in the manner described when leaving the factory. Therefore, it is only necessary to install an end of an optical fiber cable at the work site to the modular optical fiber connector of the invention herein, which avoids the aforementioned shortcomings of the conventional technology. When optical fiber cable ends are joined to the optical fiber connector of the invention herein, a section of sleeving on the end of the optical fiber cable is removed to reveal a short length of the strength member (Kevlar), the optical fiber, and the cladding and buffer. An injector is utilized to apply epoxy into the hollow buffer back post (23) of the ferrule body (20) and then the optical fiber as well as the cladding and buffer are inserted into the column through the opening in the flared end section (236) and secured into position with a crimp sleeve. The exterior wall at the end of the connector body (30) is best finished with a knurl or ridge pattern to facilitate crimping; and finally, the surface on the tip of the ferrule (80) is polished.

Based on the invention herein, when t e epoxy is injected, the flared end section (236) of the buffer back post (23) not only facilitates the entry of the injector, but also accommodates the over flow of the epoxy and thereby minimizes or prevents the possible spillage c f the adhesive. Therefore, the invention herein prevents or reduces epoxy application overflow to prevent the coil spring (18) from being glued to the buffer back post (23) and rendered inoperative as a spring. Another advantage of the flared end section (236) which defines a flared opening on the buffer back post (23) is more convenient optical fiber insertion and, as technicians are aware, the foregoing feature is a major advantage because the diameters of the optical fiber and buffer back post are quite minute.

I claim:

1. A modular optical fiber connector comprising:
a ferrule body having a longitudinal axis, a first end attached to a ferrule and a second end for receiving an optical fiber, said ferrule body including a ferrule holder at said first end for retaining said ferrule, and a buffer back post extending from said ferrule holder to said second end, said buffer back post having a buffer passage extending therethrough from said second end to said ferrule holder, said first end of said ferrule body including a tab passage extending substantially parallel to said longitudinal axis, an insert having a tab projecting outwardly therefrom and an insert passage extending therethrough to receive said ferrule, said insert being positioned against said first end of said ferrule body with ferrule extending through said insert passage and said tab received in the tab passage in said first end of said ferrule body, said insert passage and tab passage in said first end of said ferrule body being sized to permit longitudinal movement of said ferrule body and ferrule relative to said insert, said tab and tab passage in the front end of said ferrule body preventing rotational movement of said ferrule body relative to said insert, and a connector body having a longitudinal passage extending therethrough, said insert being secured within said longitudinal passage, and a spring mounted in the longitudinal passage of said connector body to extend between said connector body and said ferrule body, said spring being a coil spring mounted externally on said buffer back post to engage the first end of said ferrule body and operating to bias said ferrule body against said insert.

2. The modular optical fiber connector of claim 1 wherein an outwardly extending flange is formed at the first end of said ferrule body on said ferrule holder, said flange including said tab passage, and said coil spring engages said flange.

3. A modular optical fiber connector comprising:

a ferrule body having a longitudinal axis, a first end attached to a ferrule and a second end for receiving an optical fiber, said first end including a tab passage extending substantially parallel to said longitudinal axis, an insert having a tab projecting outwardly therefrom and an insert passage extending therethrough to receive said ferrule, said insert being positioned against said first end of said ferrule body with said ferrule extending through said insert passage and said tab received in the tab passage in said first end of said ferrule body, said insert passage and tab passage in said first end of said ferrule body being sized to permit longitudinal movement of said ferrule body and ferrule relative to said insert, said tab and tab passage in the front end of said ferrule body preventing rotational movement of said ferrule body relative to said insert, a connector body having a longitudinal passage extending therethrough, said insert being secured within said longitudinal passage, a connector nut having a connector passage extending therethrough to receive said connector body, said connector passage being dimensioned to permit longitudinal movement of said connector nut relative to said connector body, a limiting shoulder formed on said connector nut and extending into said connector passage, and spaced limiter stops extending outwardly from said connector body on opposite sides of said limiting shoulder, said limiter stops engaging said limiting shoulder to limit the extent of longitudinal movement of said connector nut relative to said connector body.

4. A modular optical fiber connector comprising:

a ferrule body having a first end attached to a ferrule, a second end for receiving an optical fiber and a longitudinal axis extending between said first and second ends.

an insert having an insert passage extending therethrough to receive said ferrule, said insert being positioned against the first end of said ferrule body with said ferrule extending through said insert passage, said insert passage being sized to permit longitudinal movement of said ferrule body and ferrule relative to said insert, a connector body having a longitudinal passage extending therethrough, said insert being secured within said longitudinal passage, a spring mounted in the longitudinal passage of said connector body to extend between said connector body and said ferrule body, said spring operating to bias said ferrule body against said insert, and a connector nut having a connector passage extending therethrough to receive said connector body, said connector passage being dimensioned to permit longitudinal movement of said connector nut relative to said connector body, a limiting shoulder formed on said connector nut and extending into said connector passage and spaced limiter stops extending outwardly from said connector body on opposite sides of said limiting shoulder, said limiter stops engaging said limiting shoulder to limit the extent of longitudinal movement of said connector nut relative to said connector body.

5. The modular optical fiber connector of claim 4 wherein said ferrule body includes a ferrule holder at said first end for retaining said ferrule, and a buffer back post extending from said ferrule holder to said second end, said buffer back post having a buffer passage extending therethrough from said second end to said ferrule holder, said spring being a coil spring mounted externally on said buffer back post to engage the first end of said ferrule body.

6. The modular optical fiber connector of claim 5 wherein said insert includes a tab projecting outwardly therefrom, said ferrule body having a tab receiving passage formed in said first end thereof to receive said tab when said insert is mounted in engagement with said first end, said tab and tab receiving passage permitting longitudinal movement of said ferrule body relative to said insert but preventing rotational movement of said ferrule body relative to said insert.

7. The modular optical fiber connector of claim 6 wherein an outwardly extending flange is formed at the first end of said ferrule body on said ferrule holder, said flange including said tab passage, and said coil spring engaging said flange.

* * * * *